(12) United States Patent
Sweeny et al.

(10) Patent No.: US 6,660,168 B2
(45) Date of Patent: Dec. 9, 2003

(54) FEEDER AND METHOD FOR PREPARING AQUEOUS SOLUTIONS CONTAINING HIGH CONCENTRATIONS OF SOLID OXIDIZERS

(75) Inventors: Philip Gerdon Sweeny, Hackettstown, NJ (US); James Howard Harvey, Montoursville, PA (US)

(73) Assignee: Lonza Inc., Fair Lawn, NJ (US)

( * ) Notice: Subject to any disclaimer, the term of this patent is extended or adjusted under 35 U.S.C. 154(b) by 56 days.

(21) Appl. No.: 10/025,194

(22) Filed: Dec. 19, 2001

(65) Prior Publication Data

US 2002/0084228 A1 Jul. 4, 2002

Related U.S. Application Data

(60) Provisional application No. 60/257,190, filed on Dec. 20, 2000.

(51) Int. Cl.$^7$ .................................................. C02F 1/00
(52) U.S. Cl. ..................... 210/739; 210/744; 210/746; 210/753; 210/758; 210/85; 210/104; 210/105; 210/143; 210/205
(58) Field of Search ................................. 210/739, 744, 210/746, 749, 753, 758, 85, 104, 105, 143, 198.1, 205

(56) References Cited

U.S. PATENT DOCUMENTS 4,091,834 A    5/1978  Frigato 5,427,748 A  * 6/1995  Wiedrich et al.
6,228,273 B1 * 5/2001  Hammonds

FOREIGN PATENT DOCUMENTS

| EP | 0 553 173 B1 | * 12/1995 |
| EP | 0925833 A1 | 12/1998 |
| GB | 2022448 | 12/1979 |
| WO | 92/06922 | 4/1992 |

* cited by examiner

Primary Examiner—Betsey Morrison Hoey
(74) Attorney, Agent, or Firm—Darby & Darby (57) ABSTRACT

A continuous method is provided for dissolving a solid oxidizer into an aqueous solution which yields a stream of the aqueous solution having a constant or near constant concentration of solid oxidizer. The method of the present invention includes (a) disposing a bed of solid oxidizer into a container; (b) introducing an aqueous solution below the top surface of the bed; and (c) removing any solution above the top surface of the bed while maintaining a constant or near constant level of aqueous solution above the bed. Preferably, step (c) is performed at about atmospheric pressure. This method can be achieved with a feeder that includes a tank for containing a bed of solid oxidizer and a disperser for introducing the aqueous solution into the tank. A sensor/control unit is provided for sensing a combined bed and aqueous solution volume within the tank and maintaining the combined volume within a predetermined range.

33 Claims, 5 Drawing Sheets

FEEDER AND METHOD FOR PREPARING AQUEOUS SOLUTIONS CONTAINING HIGH CONCENTRATIONS OF SOLID OXIDIZERS

CROSS REFERENCE TO RELATED APPLICATION

This application claims the benefit U.S. patent application No. 60/257,190, filed Dec. 20, 2000, which is hereby incorporated by reference in its entirety.

FIELD OF THE INVENTION

This invention relates to a method for preparing aqueous solutions containing high concentrations of solid oxidizers and a feeder for performing the same.

BACKGROUND OF THE INVENTION

Oxidizers are frequently used in water treatment applications including cooling waters, pools, spas, pulp manufacturing and papermaking and other applications to bleach pulp and other materials, destroy or inhibit the growth of microorganisms, inhibit or reduce slime deposits, and control odors. Many oxidizers are supplied in solid form as these provide maximum storage stability and high active concentrations facilitating material shipment and transfer. In many water treatment applications, including papermaking, oxidizers are applied as solutions. The solid oxidizers are, thus, dissolved in solution prior to application, such as, for example, with a pressurized solid dissolution feeder.

Figure 1:
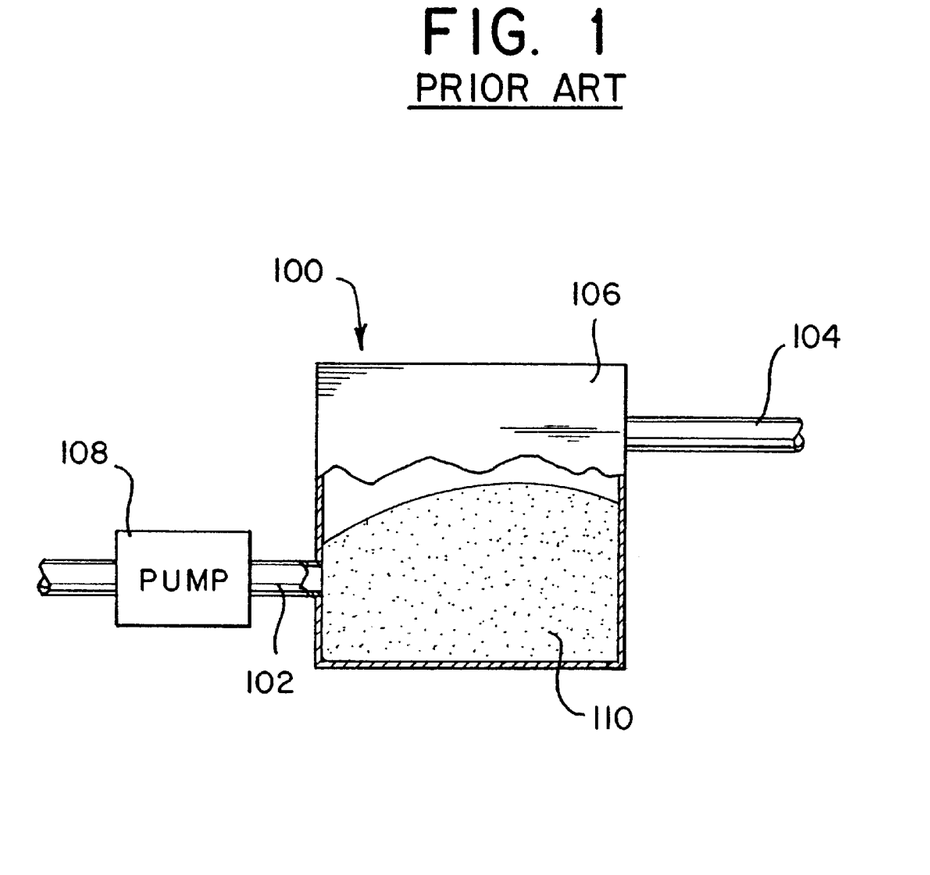
FIG. 1 is a schematic diagram of a pressurized solid dissolution feeder of the prior art.

A typical pressurized solid dissolution feeder 100 is shown in FIG. 1. The feeder 100 includes a tank 106, which contains a bed of solid oxidizer 110, with inlet and outlet pipes 102 and 104, respectively. In operation, water is pumped through the inlet pipe 102 via an inlet pump 108. As the water flows through the tank 106, which is generally at pressures of up to 10 atm gauge, some of the solid oxidizer dissolves in the water and flows out of the tank through the outlet pipe 104. Most such tanks have a volume less than or equal to 270 gallons, since larger tanks which can withstand pressures greater than 1 atm gauge are prohibitively expensive.

It is, however, difficult to produce a continuous stream of solution having a constant concentration of oxidizer with standard solid dissolution feeders. The resulting concentration of oxidizer is dependent on the water flow rate through the tank, the water temperature, and the bed volume (also known as the dissolution bed volume) in the feeder. Since the dissolution bed volume is generally small and decreasing during operation, the feeder must frequently be adjusted to maintain a constant concentration of solid oxidizer in the resulting solution, i.e., to provide a constant delivery rate of solid oxidizer. Due to these difficulties, the concentration of oxidizer in solutions prepared from a solid dissolution feeder typically decrease over a given run requiring frequent increases of water flow, thereby reducing water utilization efficiency and increasing the required level of attention.

Water utilization is an increasing concern. Trends are toward increased closure and increased cycles of concentration in recirculating water loops of high water utilization industries, such as pulp and paper production and cooling. In order to minimize water usage during the application of a solid oxidizer, it is preferable to have a feeder which yields a solution saturated or nearly saturated with the applied product. Furthermore, it is desirable to have a feeder which produces solutions having a constant or near constant concentration of oxidizer over extended periods of time, thus minimizing required adjustments and oversight. Additionally, large volume feeders are desirable as refill frequency is reduced and bulk packaging (such as supersacks) can be directly utilized.

SUMMARY OF THE INVENTION

A continuous method is provided for dissolving a solid material, such as a solid oxidizer, into an aqueous solution which yields a product stream of the aqueous solution having a more constant concentration of the solid material than is achieved with standard dissolution feeders. For purposes of simplicity only, the solid material will be discussed herein in terms of being a solid oxidizer; however, it will be understood that the present invention is not limited to the use of solid oxidizers as the solid material and a number of other solid materials that are capable of dissolving in the aqueous solution can be used in the present feeder. In other words, the concentration of solid oxidizer in the product stream obtained from the present feeder decreases less over time in comparison to product streams obtained from traditional feeders. The method of the present invention includes (a) disposing a bed of solid oxidizer into a container; (b) introducing an aqueous solution below the top surface of the bed; and (c) removing solution from the top surface of the bed while maintaining a constant or near constant combined volume of aqueous solution and solid oxidizer (hereinafter referred to as the "Combined Volume") in the container. Preferably, step (c) is performed at about atmospheric pressure. The volume of the bed is preferably maintained at a volume that is at least sufficient to yield a product stream having a concentration of solid oxidizer which is at least 30% by weight of the saturation concentration (i.e., the concentration of the solid oxidizer in the aqueous solution when saturated with the solid oxidizer).

This method can be achieved with a feeder of the present invention. The feeder includes a tank for containing a bed of solid oxidizer, a disperser for introducing the aqueous solution into the tank and a controller. The tank has a bottom, an inlet, and an outlet. The disperser is in fluid communication with the inlet of the tank and is below the top surface of the bed. Preferably, the disperser is at or near the bottom of the tank. As the aqueous solution is dispersed from the disperser, it flows through the bed of solid oxidizer until it rises above the bed as an aqueous solution product. The aqueous solution product above the bed typically contains a high concentration of the solid oxidizer (e.g., having a concentration of at least 30% or at least greater than 60% of the saturation concentration) and is removed from the tank through the outlet. The Combined Volume in the tank is maintained at or near a constant volume over time by the controller. The controller refills the tank with water to maintain the Combined Volume. Unlike prior solid dissolution feeders, which require high pressure vessels to handle the typically high unregulated inlet water line pressure which is necessary to obtain aqueous solution flow rates required to provide desired product application rates at the typically low product concentrations (where flow rate×concentration=application rate), the present feeder can produce equivalent product application rates at atmospheric pressure at low aqueous solution flow rates. Furthermore, the feeder of the present invention can handle large bed volumes of solid oxidizer. The bed volume in prior dissolution feeders was limited since a pressurized tank was needed. Additionally, the feeder of the present invention can optimize aqueous solution usage by maximizing oxidizer concentrations in the resulting solution. As a result, the feeder of the present invention can be produced and operated at a fraction of the cost of a traditional pressurized feeder.

Another embodiment is a method of dissolving a solid oxidizer into an aqueous solution by dissolving the solid oxidizer into the aqueous solution with the feeder of the present invention.

Yet another embodiment is a method for calibrating the feeder. The method includes the steps of first selecting a flow rate of the aqueous solution discharged from the tank. Second, a solubility curve for varying bed volumes (or apparent residence times) is prepared at the selected flow rate. Typically, as the bed volume (or apparent residence time) decreases, so does the solid oxidizer concentration in the product stream. Third, an initial bed volume for the solid oxidizer is selected based on the solubility curve for the feeder. Preferably, the initial bed volume is sufficient to yield a product stream having a solid oxidizer concentration of at least about 50, 60, 70, 80, 90, 95, 96, 97, 98, or 99% of the saturation concentration. Fourth, a minimum (or final) bed volume is selected based on the solubility curve for the feeder. The minimum bed volume is generally selected based on acceptable tolerance limits for the variation of the solid oxidizer concentration in the product stream. Generally, the minimum bed volume is that which produces a solution concentration of about 30% of the saturation concentration. During operation, the bed volume is initially set at the initial volume and then over time as the solid oxidizer dissolves into the aqueous solution, the observed bed volume decreases. Preferably, once the observed bed volume reaches the minimum bed volume, an action is taken. For example, more solid oxidizer is added to the tank or the feeder process is stopped.

The feeder of the present invention is particularly useful in papermaking, industrial cooling and other high volume applications.

DETAILED DESCRIPTION OF THE INVENTION

A method is provided for dissolving a solid oxidizer into a stream of aqueous solution, which produces a product stream of solution having a concentration of solid oxidizer that is within a predetermined range. For example and according to one embodiment, the solid oxidizer concentration of the product stream is at least about 20, 30, 40, 50, 60, 70, 80, 90, or greater than 95% of the saturation concentration (by weight or volume). Furthermore, this method can be used with large bed volumes, i.e., bed volumes greater than 250 gallons. The method includes (a) disposing a bed of solid oxidizer into a container, the bed having a top surface; (b) introducing an aqueous solution below the top surface of the bed; and (c) removing the solution above the top surface of the bed while maintaining a constant or near constant combined volume of aqueous solution and solid oxidizer within the container (the "Combined Volume"). The solution removed is referred to herein as the "product stream". Preferably, the flow rate of the product stream being discharged from the container is kept approximately constant over time and the average flow rate of the aqueous solution flowing into the container is over time approximately equal to the flow rate of the product stream.

The solid oxidizer can be a halogenated oxidizer, non-halogenated oxidizer, or any combination thereof. Suitable halogenated oxidizers include, but are not limited to, halogenated hydantoins, such as 1 or 3-chloro-5,5-dimethyl hydantoin (MC), 1 or 3-chloro-5-ethyl-5-methylhydantion (MCMEH); 1-bromo-3-chloro-5,5-dimethyl hydantoin (BCDMH), 1,3-dichloro-5,5-dimethylhydantoin (DCDMH), and 1,3-dichloro-5-ethyl-5-methylhydantoin (DCEMH); 1,3-dibromo-5,5-dimethylhydantoin; trichlorocyanuric acid; sodium dichlorocyanuric acid; calcium hypochlorite; lithium hypochlorite; dibromonitropropionamide (DBNPA); and any combination of any of the foregoing. Preferred halogenated oxidizers include, but are not limited to, Dantobrom® PG granular (a mixture of BCDMH, DCDMH, and DCEMH) and Dantochlor® (a mixture of DCMEH and DCDMH), both available from Lonza Inc. of Fair Lawn, N.J. Suitable non-halogenated oxidizers include, but are not limited to, sodium percarbonate, sodium perborates (monohydrates, tetrahydrates, etc.), sodium persulfate, potassium peroxy monosulfate (such as Ozone® from DuPont, Wilmington, Del.), magnesium monoperoxyphthalate (such as Lonzabac® MP from Lonza Inc.), and any combination of any of the foregoing. The solid oxidizers can be in any solid form, such as powders, granules, briquettes, tablets, extrudates, and the like.

Preferred solid oxidizers include, but are not limited to, those having the formula where $R_1$ and $R_2$ are independently selected from lower alkyl having 1 to 12 carbon atoms and $X_1$ and $X_2$ are independently selected from hydrogen, bromine, or chlorine.

The solid oxidizer can also be formulated with solubilizing aids such as highly soluble salts, such as sodium chloride, sodium sulfate, sodium carbonate, sodium bicarbonate, sodium bromide, boric acid and the like and/or wetting agents, such as sodium dioctylsulfosuccinate, disodium lauryl sulfosuccinate, sodium lauryl sulfoacetate.

The volume of the bed is preferably greater than 250, 400 or 600 gallons.

The aqueous solution is preferably introduced below the middle of the bed and more preferably near or at the bottom of the bed.

Preferably, the volume of the bed is maintained at a volume sufficient to obtain a product stream having a concentration of solid oxidizer which is at least about 20, 30, 40, 50, 60, 70, 80, 90, or greater than 95% of the saturation concentration for the solid oxidizer (by weight or volume).

According to one exemplary embodiment, the aqueous solution flows through the bed at a rate of from about 0.1 to about 100 gallons per minute and is discharged from the feeder at about 0.25 to about 30 gallons per minute. Generally, the temperature at which this method is performed ranges from about 32 to about 200° F.

Unlike prior art methods of dissolving solid oxidizers, this method can be performed at or near atmospheric pressure. As a result, large unpressurized containers for holding the bed of solid oxidizer can be used. This method can, therefore, be performed in standard intermediate bulk containers which are used for shipping.

Figure 2:
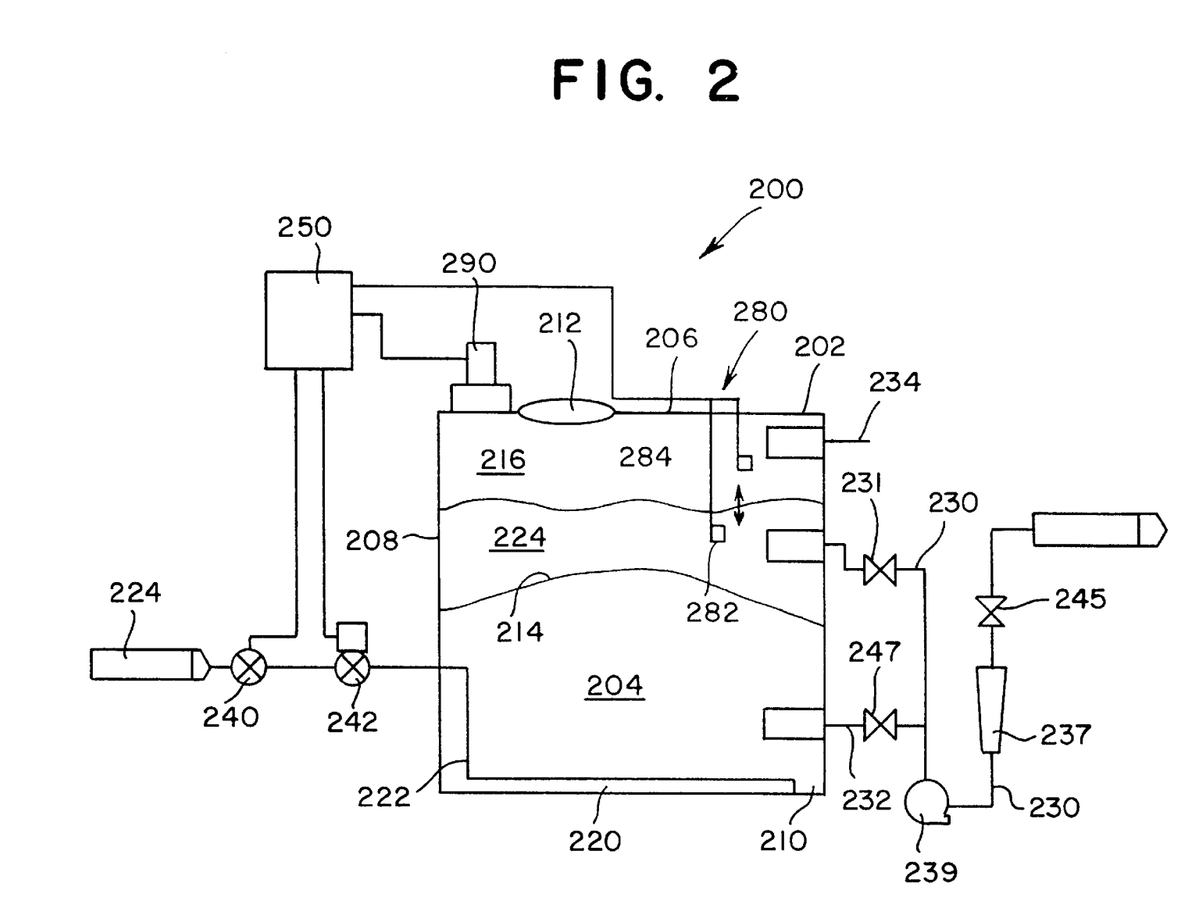
FIG. 2 is a schematic of a high concentration solid dissolution feeder according to one exemplary embodiment.

FIG. 2 shows a feeder system 200 which accommodates the present continuous method of dissolving a solid oxidizer into an aqueous solution to yield a product stream of the aqueous solution having a more constant concentration of solid oxidizer than standard dissolution feeders. The feeder system 200 includes a tank 202 for containing a bed of solid oxidizer 204 and for receiving and discharging an aqueous solution. As previously-mentioned, one difference between the present system 200 and prior feeder systems is that the present system 200 can use a tank of atmospheric pressure rating. In direct contrast, conventional feeder systems must use a pressurized vessel as the feeder tank. The tank 202 can be constructed of any known material which is resilient to the solid oxidizers and the aqueous solution in which the solid oxidizers are to be dissolved. Suitable materials include, but are not limited to, polyvinyl chloride (PVC), chlorinated polyvinyl chloride (CPVC), high density polyethylene (HDPE), fiberglass and any combination of any of the foregoing. The specific size (e.g., volume) of the tank 202 will vary depending upon the precise application; however, the tank volume is preferably greater than 270, 400, or 600 gallons. Furthermore, the tank 202 is constructed of a material that can withstand the internal pressure generated by the weight of the aqueous solution and the solid oxidizer 204 present.

The tank 202 has a top 206, a side 208, and a bottom 210. In the top 206 of the tank 202, an opening 212 is formed for refilling the bed of solid oxidizer 204. The opening 212 thus functions as a product refill hatch and its size will vary according to the overall size of the tank 202 and the product refill package size. In one exemplary embodiment, the opening 212 does not include an airtight cover due to the system 200 and, more particularly, the tank 202 is a unpressurized system that is open to the atmosphere. The opening 212 thus serves as a means for opening the tank 202 to the atmosphere to ensure that the tank 202 generally operates at or near atmospheric conditions. Once the solid oxidizer 204 is disposed into the tank 202, the solid oxidizer 204 settles to the bottom 210 of the tank 202. The bed of solid oxidizer 204 preferably extends across the entire bottom 210 and has a top surface 214 that is below the top 206. A space 216 is formed between the top surface 214 and the top 206 of the tank 202.

The system 200 also includes a disperser 220 for introducing the aqueous solution into the tank 202. The disperser 220 is positioned below the top surface 214 of the solid oxidizer 204 and preferably, the disperser 220 is positioned at or near the bottom 210 of the tank 202. In the illustrated embodiment, the disperser 220 is positioned generally at the bottom 210 of the tank 202. The disperser 220 can be in any number of forms so long as the disperser 220 is capable of accomplishing the intended purpose of introducing aqueous solution into the tank 202 and into contact with the solid oxidizer 204. Because of its intimate proximity to the solid oxidizer (i.e., preferably in contact therewith), the disperser 220 is preferably formed of a material that is compatible with the solid oxidizers 204 and the other the materials/solutions used in the present system 200.

The aqueous solution (e.g., water) is delivered through an inlet conduit 222 from an aqueous solution supply source 224 to the disperser 220. The inlet conduit 222 passes through the side 208 of the tank 202 and then is configured so that it is in fluid communication with the disperser 220. The precise location of the inlet conduit 222 relative to the disperser 220 is not critical; however, the inlet conduit 222 likely will enter through the side 208 at a location above the disperser 220 due to the disperser 220 being located near or at the bottom 210. The aqueous solution can be delivered to the disperser 220 using any number of conventional means, including a pump (not shown) or the like. As with the other components of the system 200, the inlet conduit 222 is formed of a material that is suitable for its intended use and is compatible with the materials used in the system 200. For example, the inlet conduit 222 can be a pipe formed of a suitable plastic material.

When aqueous solution is introduced into the system through the disperser 220, the aqueous solution flows through the bed of solid oxidizer 204 as it rises to the top surface 214 of the solid oxidizer 204. As the aqueous solution traverses through the solid oxidizer 204, the solid oxidizer 204 dissolves into the aqueous solution, thereby causing the aqueous solution to become partially or completely saturated with the solid oxidizer 204. During operation, the solid oxidizer 204 is preferably submersed in the aqueous solution, as shown in FIG. 2. As shown in FIG. 2, an aqueous solution product layer 224 (containing the dissolved solid oxidizer 204) is formed above the top surface 214 of the bed of solid oxidizer 204. The combined volume is thus the sum of the volume of the aqueous solution product layer 224 and the volume of the bed of solid oxidizer 204.

The system 200 also includes one or more outlets for discharging the aqueous solution product as a product stream from the tank 202 after the solution has traveled through the bed of solid oxidizer 204. In the illustrated embodiment, the system 200 includes a primary outlet conduit 230, a first drain conduit 232, and a second drain conduit 234. The primary outlet conduit 230 is in fluid communication with the aqueous solution product contained in the interior of the tank 202 and provides a means for discharging the aqueous solution product from the interior of the tank 202 to another location outside of the tank 202. The primary outlet conduit 230 is preferably formed in a location within the aqueous solution product layer 224 above the bed of solid oxidizer 204 to permit the aqueous solution product to be easily discharged from the tank 202. The primary outlet conduit 230 is formed through the side 208 of the tank 202 and then is routed to a location outside of the tank 202 (e.g., a storage tank, etc. or a remote location where the aqueous solution product is further processed or used). The top surface 206 of the bed of solid oxidizer 204 lies below the primary outlet conduit 230.

The first drain outlet 232 is a conduit that extends from the tank 202 and is connected to the primary outlet conduit 230 for draining the aqueous solution product under select conditions, i.e., repair, replacement, or cleaning of the tank 202. In the illustrated embodiment, the first drain outlet 232 is located below the primary outlet conduit 230 and is located where the bed of solid oxidizer 208 is located. Thus, the aqueous solution product that is discharged through the first drain outlet 232 is solution that is within the bed of solid oxidizer below the aqueous solution product layer 224.

The second drain outlet 234 is a conduit that can be used alone or in combination with the first drain outlet 232 (as well as the primary outlet conduit 230). The second drain outlet 234 is a conduit that serves as an emergency overflow conduit to discharge aqueous solution product under emergency situations. The second drain conduit 234 is therefore formed in the side 208 at a position near the top 206 of the tank 202. The second drain conduit 234 is located at a position above the upper level of the aqueous solution product during normal operation of the system 200. Thus, the aqueous solution product only reaches the second drain conduit 234 when the system 200 is improperly operating, etc. In the illustrated embodiment, the second drain conduit 234 leads to a drain (not shown) and is not connected to the primary outlet conduit 230 and the first drain outlet 232. However, any other number of other configurations are possible.

The primary outlet conduit 230, the first drain outlet 232 and the second drain outlet 234 are formed of suitable materials that are designed to be compatible with the solid oxidizer 204 and the aqueous solution. In one embodiment, each of these conduits 230, 232, 234 is a pipe constructed of a suitable plastic material.

In the illustrated embodiment, a pump 239 is used to discharge the aqueous solution product as the product stream from the tank 202. The pump 239 is provided along the primary outlet conduit 230. The pump 239 can be any number of standard process pumps that serve to pump fluid through a conduit, such as the primary outlet conduit 230. As with the other components of the system 200, the pump 239 is formed of a material that is compatible with the solid oxidizer 204 and aqueous solution. One exemplary pump 239 is commercially available under the trade name March Model TE-7R-MD Pump from U.S. Plastics Corp of Lima, Ohio.

The system 200 also includes a series of valves to maintain the Combined Volume at or near a constant volume within the tank 202 by controlling the flow of at least one of the aqueous solution and product stream through one or more of the conduits. In one exemplary embodiment, the primary inlet conduit 222 has a first valve 240 (e.g., a solenoid valve) and a control valve 242. The control valve 242 is located downstream of the first valve 240 and in an exemplary embodiment, the control valve 242 includes an electronic valve actuator that operatively controls an in-line ball valve for opening and closing the primary inlet conduit 222 during various operational conditions. The first valve 240 is a valve device that is actuated by a solenoid for controlling the flow of the aqueous solution through the primary inlet conduit 222. One exemplary first valve 240 is a 2-way internal pilot operated solenoid valve Bulletin 8210, commercially available from ASCO Valves of Florham Park, N.J., and one exemplary control valve 242 is available under the trade name electric valve actuator series 75 from Worcester Controls of Marlborough, Mass.

The first valve 240 and the control valve 242 are operatively connected to a controller 250 that is used to control the flow of the aqueous solution through the tank 202 and perform other operations. The communication between the first valve 240 and the control valve 242 with the controller 250 can be by any known means, including by wiring or by wireless communication means. The controller 250 is a process controller for use in this type of system and in one embodiment, the controller 250 is a microprocessor based controller for use in an open loop valve motor drive (VMD) applications with programmable PID (proportional band integral derivative) parameters. One exemplary controller 250 is available under the trade name VMD controller MIC 1167 from Partlow Corporation of West Hartford, N.Y.

Other conduits of the system 200 also can contain a valve device for permitting or restricting the flow of the aqueous solution through the respective conduit. For example, the primary outlet conduit 230 contains a number of valves for regulating the flow of the product stream through the primary outlet conduit 230. In one embodiment, the primary outlet conduit 230 contains a process valve 231 that is disposed within the primary outlet conduit 230 proximate to the tank 202 and upstream of the pump 239 for controlling the flow of the aqueous solution. One exemplary process valve 231 is a standard in-line ball valve that is formed of a material that is compatible with the solid oxidizer 204.

The primary outlet conduit 230 also contains a flow meter 237 that monitors the flow rate of the product stream as it flows through the primary outlet conduit 230 away from the tank 202. The flow meter 237 is a standard flow meter that is commercially available from a number of sources. The flow meter 237 is disposed within the primary outlet conduit 230 downstream of the pump 239. The primary outlet conduit 230 can also contain an adjustable flow valve 245 that is located downstream of the flow meter 237. The adjustable flow valve 245 is an in-line ball valve, in one embodiment, that can variably control the flow rate of the product stream through the primary outlet conduit 230.

The first drain outlet 232 can also contain a valve device, namely a drain valve 247 that is located in the first drain outlet 232 prior to the connection point between the first drain outlet 232 and the primary outlet conduit 230. As with some of the other valves, the drain valve 247 can be an in-line ball valve.

The system 200 is a programmable based system that uses the controller 250 as well as other process control components in order to ensure that the Combined Volume is maintained within a predetermined range. In addition to the controller 250, these process control components include the first valve 240 and the control valve 242, the operation of each will be described in greater detail later. When the controller 250 detects that a change in the flow rate of the aqueous solution is needed, the controller 250 signals the control valve 242 (preferably an electronic valve device) to either open or close, thereby changing the flow rate of the aqueous solution into the tank 202. This permits the overall control system to maintain the Combined Volume within a pre-selected range in the tank 202. This pre-selected range is selected based on several parameters, including the tank size, the location of the second drain outlet 234, and the location of the primary outlet conduit 230.

The process control components also include a sensing device, generally indicated at 280, for sensing the Combined Volume in the tank 202. In one exemplary embodiment, the sensing device 280 is a conductance level switch that includes a first probe 282 and a second probe 284 (commercially available under the trade name Model 516 conductance level switch from Delta Controls Corp. of Shreveport, La.). The first probe 282 is positioned within the interior of the tank 202 such that during normal operation, the probe 282 is positioned within the aqueous solution product layer 224 and therefore, the probe 282 is submersed in aqueous solution product during normal operation. In the illustrated embodiment, the probe 282 is positioned near the location where the primary outlet conduit 230 interfaces with the tank 202. The probe 284 is disposed above the probe 282 and near the second drain outlet 234 (the emergency drain outlet). The probe 284 is thus located in a position within the tank 202 where the aqueous solution product is not present during normal operation. The probe 284 thus serves to monitor and sense when the aqueous solution product reaches a maximum volume in the tank 202.

The probes 282, 284 operate in the following manner. When both probes 282, 284 are submersed in aqueous solution product, a closed loop is formed and a control signal is sent to the controller 250 as a result of the closed loop condition. Upon the controller 250 receiving this control signal, the controller 250 then signals the first valve 240 (the solenoid valve) to close, thereby shutting off the supply of aqueous solution into the tank 202. This action of closing the first valve 240 prevents overflow of the aqueous solution. The first valve 240 is thus normally opened during operation of the system 200.

Once the level of the aqueous solution product drops below the probe 284, the closed loop is broken and the control signal is no longer sent to the controller 250. This results in the controller 250 instructing the valve 240 to open. The Combined Volume drops over time after the valve 240 is closed as a result of the pumping action of pump 239. The probes 282, 284 are made of materials that are compatible with the solid oxidizer and the aqueous solution. During normal operation, the switch (probes 282, 284) is continuously opened and closed so as to maintain the Combined Volume within the predetermined range.

The controller 250 is also in communication with a sensing device 290 that detects the Combined Volume in the tank 202 and works in combination with the controller 250 to control the amount of aqueous solution being delivered into the tank 202. The level sensing device 290 can comprise any sensing and controlling device that is configured to detect the Combined Volume and is also formed of a material that is compatible with the solid oxidizer. Exemplary sensing devices 290 include, but are not limited to, standard float valves which directly attenuate the inlet flow (through the inlet conduit 222) and conductance level sensors (such as probes 282, 284 which are utilized as back-up level control in the illustrated system 200). More preferably, the sensing device 290 is an ultrasonic based sensing device. In the embodiment of FIG. 2, the sensing device 290 is a loop powdered ultrasonic level transmitter which detects the Combined Volume within the tank 202. Preferably, the transmitter 290 is disposed near or at the top 206 of the tank 202. The transmitter 290 includes one or more ultrasonic sensors that serve to continuously detect the Combined Volume within the tank 202. The transmitter 290 is of a type that transmits the Combined Volume as a signal to the controller 250 based upon information that is received from transmitting and receiving back an ultrasonic beam. The ultrasonic beam strikes the upper surface of the aqueous solution product layer 224 and the transmitter 290 determines the Combined Volume based on the distance measured between the ultrasonic sensor component and the upper surface of the aqueous solution product layer 224. The transmitter 290 can be adjusted to detect certain densities and therefore is capable of being used in a wide range of applications (in other words the transmitter can be fine tuned to detect certain densities, if necessary). The detected combined volume can be sent as an equivalent 4–20 mA signal in a current loop. One exemplary transmitter 290 is commercially available under the trade name loop powered ultrasonic level transmitter model 872C from Delta Controls Corp. of Shreveport, La.

The controller 250 then receives and processes this signal and communicates with the control valve 242, which makes any necessary adjustments to the flow rate of the aqueous solution based on the information gathered by the sensing device 290. For example, if the signal received at the controller 250 from the ultrasonic transmitter device 290 indicates that the Combined Volume is too low, the controller 250 instructs (e.g., as by sending a signal) the control valve 242 to open a pre-determined amount, thereby increasing the flow rate of the aqueous solution into the tank 202 until the Combined Volume reaches the initial, desired Combined Volume value or is within an acceptable range thereof. Conversely, if the signal received by the controller 250 indicates that the Combined Volume is too high, the controller 250 instructs the control valve 242 to close a pre-determined amount, thereby decreasing the flow rate.

The Figures do not illustrate possible further refinements of increasing the level of agitation in the dissolving bed 204 through direct means such as a standard stirring agitator common in the industry or be recirculating part of the outlet stream back through the inlet dispenser by associated piping modifications. The later increasing the flow rate through the bed without increasing the flow rate to the process stream.

It will be appreciated that one of the aforementioned sensing devices can be used alone as the means for monitoring and maintaining a proper, desired aqueous solution level; however, it is preferred that a combination of independent sensing devices be used, with one sensing device acting as a primary sensing device and the other sensing device(s) acting as a back-up sensing device. In the illustrated embodiment, the primary sensing device is the ultrasonic transmitter, while the back-up sensing device is the conductance level sensors (probes 282, 284).

It will also be appreciated that a sensing device or the like can be used with the tank 202 for directly detecting when the bed volume is too low. For example a sensing device can be employed and tuned to detect solid objects in the tank 202, as compared to solutions, and the sensing device can continuously determine the volume of the solid oxidizer bed. Once the bed reaches a low value (which can be programmed into a control unit), the control unit can sound an alarm or otherwise indicate that the bed volume is low. In another embodiment, the tank 202 is formed of a translucent material so that the bed volume can be visually detected. This also permits optical sensors and the like to be used to detect the bed volume.

By maintaining the bed volume within a certain range, the concentration of solid oxidizer in the product stream can be kept within a predetermined range. The initial and minimum bed volume for producing a product stream having a given concentration with the feeder of the present invention can be determined as follows.

First, a flow rate of the product stream discharged from the tank 202 is selected. The average flow rate of the aqueous solution into the tank 202 over time is typically the same as the flow rate of the product stream out of the tank 202 over time, since the latter is generally constant. The maximum acceptable flow rate of the aqueous solution through tank 202 is generally determined based on the cost and availability of the aqueous solution.

Second, a solubility curve for varying bed volumes (or apparent residence times) is prepared at the selected flow rate. The term "apparent residence time" refers to the bed volume of solid oxidizer 204 (in gallons) divided by the flow rate (in gallons per minute). When the flow rate is held constant, the apparent residence time is directly proportional to the bed volume of solid oxidizer 204. The term "solubility curve" refers to a graph of the solid oxidizer concentration in the product stream versus the bed volume of solid oxidizer (or apparent residence time). Typically, as the bed volume (or apparent residence time) decreases, so does the solid oxidizer concentration in the product stream.

Third, an initial bed volume for the solid oxidizer 204 is selected based on the solubility curve for the feeder. The initial bed volume refers to the volume of solid oxidizer placed in the tank 202 before operation. The initial bed volume may be selected based on the desired tolerance limits for the solid oxidizer concentration in the product stream. The bed volume necessary to obtain a desired solid oxidizer concentration can be interpolated or extrapolated from the solubility curve by known techniques. Generally, the initial bed volume is selected so that the concentration of solid oxidizer in the product stream is at least the desired concentration. Preferably, the initial bed volume is sufficient to yield a product stream having a solid oxidizer concentration of at least about 50, 60, 70, 80, 90, 95, 96, 97, 98, or 99% of the saturation concentration (by weight or volume).

Fourth, a minimum (or final) bed volume is selected based on the solubility curve for the feeder. The minimum bed volume refers to the volume of solid oxidizer at which the feeder is stopped and/or refilled. The minimum bed volume is generally selected based on desired tolerance limits for the solid oxidizer concentration in the product stream. For example, the minimum bed volume may be that which yields a product stream having a solid oxidizer concentration which is at least about 20, 30, 40, 50, 60, 70, 80, 90, or 95% of the saturation concentration (by weight or volume). According to one embodiment, the minimum bed volume is selected such that it yields a product stream having a solid oxidizer concentration which is at least about 50, 55, 60, 65, 70, 75, 80, 85, 90, or 95% of the solid oxidizer concentration yielded from the initial bed volume (by weight or volume). The minimum bed volume is generally a function of the feeder design, tank size, volume of water in the tank, desired solid oxidizer concentration in the final solution, flow rate through the tank, and particle size and type of solid oxidizer.

The feeder can also be calibrated by (1) selecting a bed volume; (2) preparing a solubility curve (concentration of oxidizer in the product stream vs. apparent residence time) by varying the flow rate of solution from the tank 202 at the selected bed volume; (3) selecting a flow rate; and (4) selecting an initial and minimum bed volume by a method analogous to that described above based on the selected flow rate. At a constant bed volume, the apparent residence time is inversely proportional to the flow rate.

It is further understood that temperature, product type, and particle size will affect the described solubility curves. Increased temperature, increased inherent product solubility and decreased particle size will all increase solution concentrations at constant apparent residence times. For a specified product type and dissolution temperature, smaller particle sizes will achieve saturation at lower bed volumes (shorter apparent residence times) and are thus to be desired. Thus for the exemplary Dantobrom PG®, while all product forms are viable (e.g., tablets, briquettes, extrudates, granular and powder), granular and powder forms are preferred. Thus, particle sizes averaging 1 cm in diameter or below are preferred and even more preferred are particle sizes of 4 mm in diameter or below.

There are numerous advantages of utilizing atmospheric pressure tanks, as in the present system 200, rather than the pressurized vessels that are used in conventional feeder systems. First, the overall system costs are significantly reduced due to the lower cost of the atmospheric pressure tanks compared to the pressurized vessels. Second, pressure relief valves to avoid over pressurization and potential tank rupture are not required (thereby reducing the cost and increasing safety of the present system). Third, product refill inlets (i.e., opening 212 of FIG. 2) can be tailored to suit a variety of packaging shapes and sizes without incurring high costs of custom pressure vessels. Fourth, larger tanks can be utilized at equivalent costs reducing required tank refill frequency and producing more stable product delivery rates over equivalent product addition volumes. Fifth, translucent tanks can be utilized allowing direct product level visualization which in standard pressure vessels is typically obscured by wall thickness and material of construction. Sixth, atmospheric pressure tanks do not require depressurization prior to product refill. This results in increased safety and eliminates the requirement of pressure gauges to insure complete depressurization. Seventh, as the atmospheric tanks are utilized with an outlet pump, the tank can be drained by pumping directly to the treated process stream. Typical operation of pressurized vessels to a pressurized outlet requires drainage to an atmospheric pressure source such as to waste. Eighth, large dissolution vessels allow the use of reduced inlet water flow rates to achieve equivalent outlet product concentrations, thus minimizing water usage.

The present system 200 is thus a high concentration, non-pressurized feeder system that provides improved performance over conventional pressurized feeder systems. As previously-mentioned, the present system 200 utilizes a tank of atmospheric pressure rating. This yields the aforementioned benefits. Furthermore, the present system 200 also uses a control system for controlling and maintaining the level of the aqueous solution to within a pre-selected range. Preferably, the control system has a primary sensing/control device and a back-up secondary sensing/control device.

The following examples are illustrative of the present invention, however, it will be understood that the invention is not limited to the specific details set forth in the examples. All percentages are by weight unless otherwise indicated.

EXAMPLE 1

Dantobrom® PG granular, available from Lonza Inc. of Fair Lawn, N.J., was dissolved in water at various flow rates in three separate standard dissolution feeders to define a product dissolution curve as a function of apparent residence time. The Dantobrom® PG granular average particle size was approximately 1.2 mm. The obtained performance curve shown in FIG. 3 was utilized to design the high concentration feeders. The data was generally obtained at 50° F. When inlet temperature fluctuations were observed, the obtained data was normalized to 50° F. using established relative solubility factors. The apparent residence time was established at various setpoints by changing the flow rate. The outlet halogen concentration was measured upon equilibration. Apparent residence time was defined as the time it would take for water to flow from the feeder inlet to the top surface of an aqueous solution having a volume equal to that of the product bed in the feeder, as shown in Equation 1.

Apparent residence time ($min$)=product bed volume (gallons)/flow rate (gallons/minute)  Equation 1

In the first dissolution test, a standard pressurizable feeder (such as the tank 106 of FIG. 1) having a total tank capacity of 2 gallons was utilized with a one gallon bed of Dantobrom® PG granular at flow rates of 0.25 gallon/minute (GPM) to 4 gallons/minute (GPM) to obtain a data set at apparent residence times of 4.0 min to 0.25 min.

In the second dissolution test, a standard pressurizable feeder having a total tank capacity of 50 gallons was utilized with a 10 gallon bed of Dantobrom® PG granular at flow rates of 1 GPM to 20 GPM to obtain a data set at apparent residence times of 10 minutes to 0.5 minute.

In the third dissolution test, a standard pressurizable feeder having a total tank capacity of 270 gallons was utilized with a 50 gallon bed of Dantobrom® PG granular at flow rates of 1 GPM to 20 GPM to obtain a data set at apparent residence times of 50 minutes to 2.5 minute.

Figure 3:
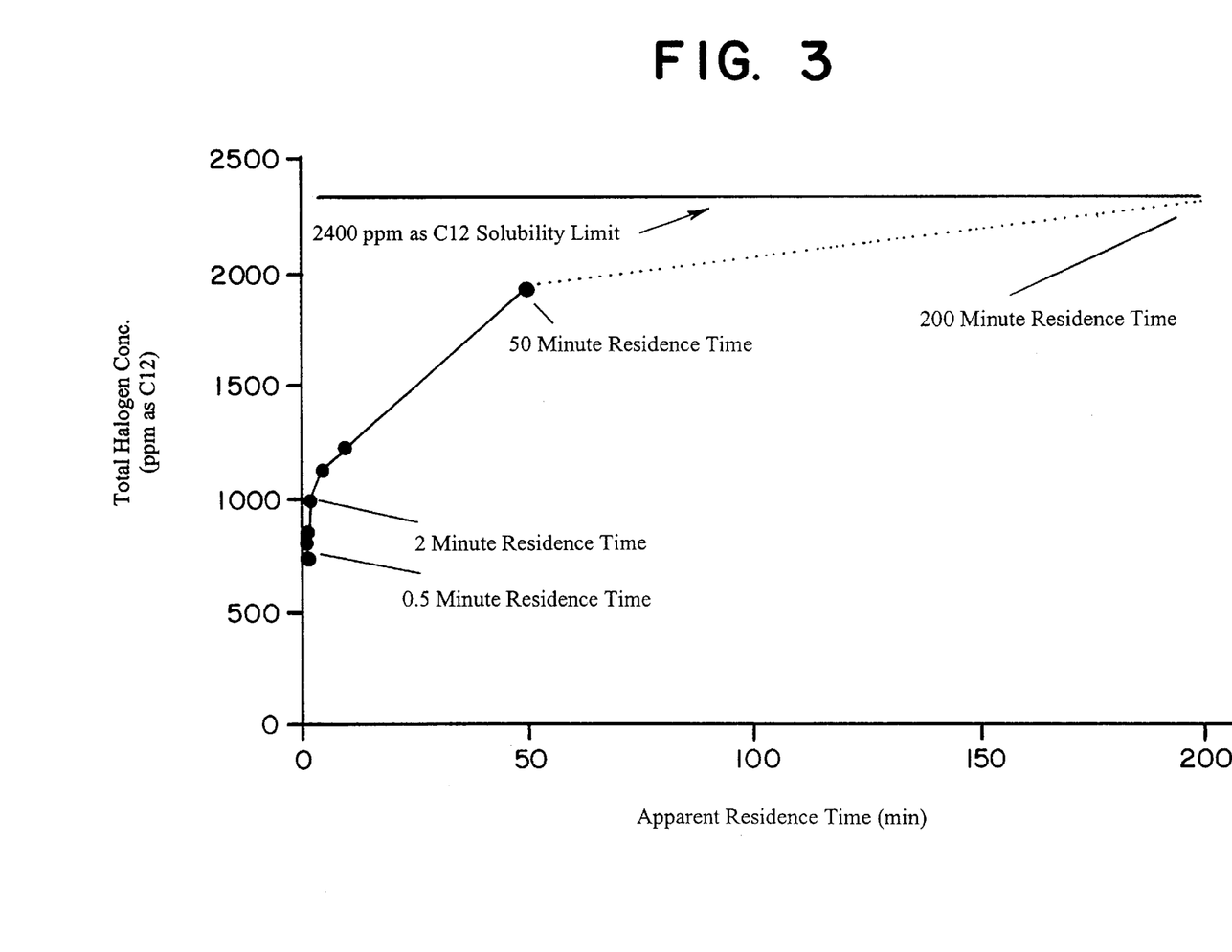
FIG. 3 is a graph of the halogen concentration (expressed as ppm of $Cl_2$) of prepared solutions versus the apparent residence time of the aqueous solution in a bed of solid oxidizer (Dantobrom® PG granular)

The average results adjusted to 50° F. are summarized in FIG. 3. As indicated, outlet product concentrations initially increase rapidly with increased apparent residence time. At extended residence times, product dissolution rates vary less significantly with residence time, especially as the concentration approaches the saturation level.

Figure 4:
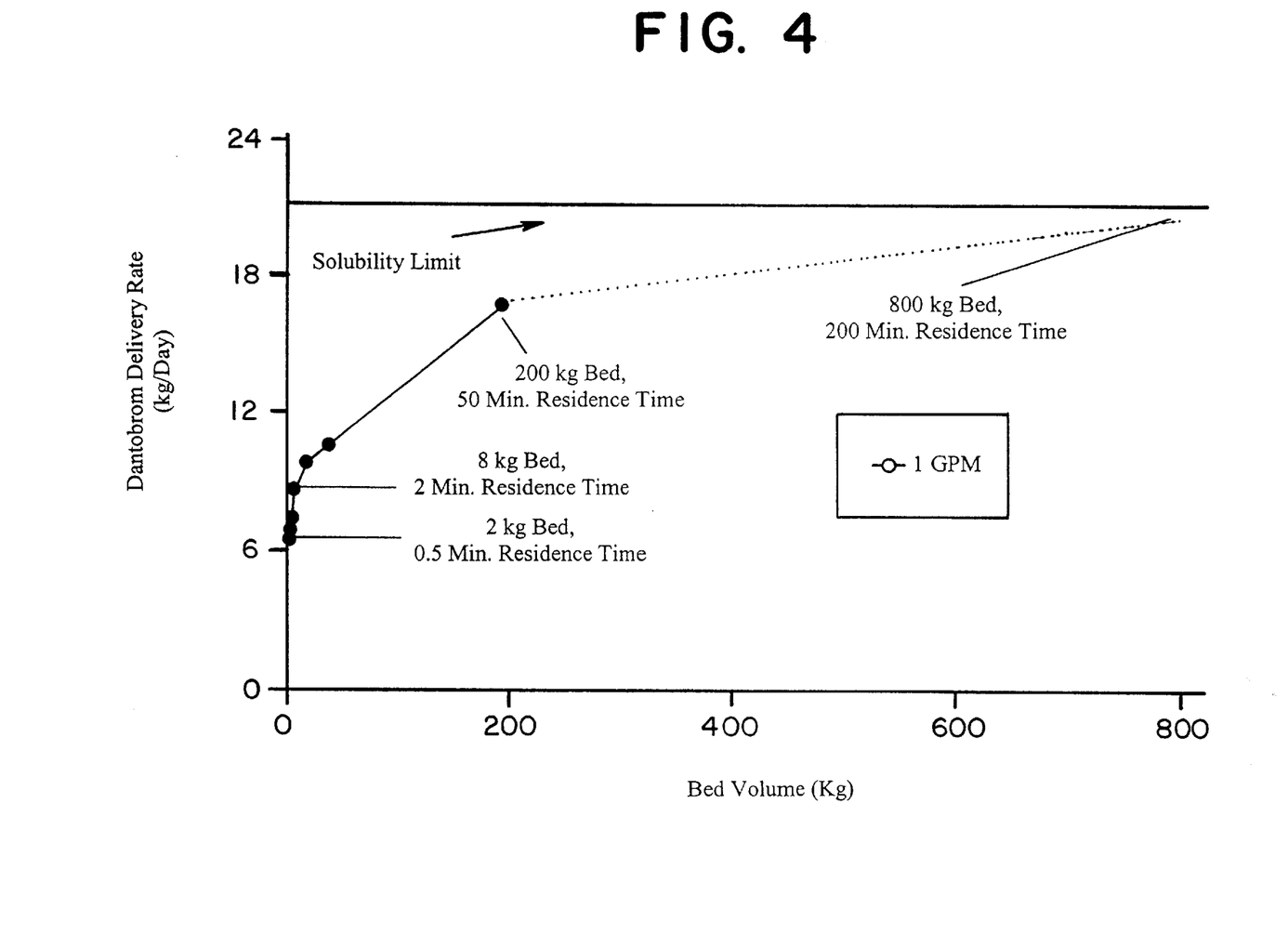
FIG. 4 is a graph of the amount of Dantobrom® PG granular which would be dissolved per day (kg/day) by a feeder of the present invention versus the bed volume of Dantobrom® PG granular in the feeder at the flow rate of 1 gallon per minute (GPM)

FIG. 4 is a design curve extrapolated from FIG. 3 at the set flow rate of 1 GPM. Thus, FIG. 4 shows the quantity of Dantobrom® PG granular (kg/day) that would be dissolved as a function of bed volume at the selected 1 GPM flow rate dissolved. Between 800 and 200 kg bed volumes, the concentration of oxidizer in the product stream only decreased 20%. Therefore, operation at an initial bed volume of 800 kg allows for 600 kg of oxidizer to be dissolved before a 20% decrease in the concentration of oxidizer in the product stream is observed. This is a dramatic improvement over typical solid dissolution feeders.

EXAMPLE 2

Figure 5:
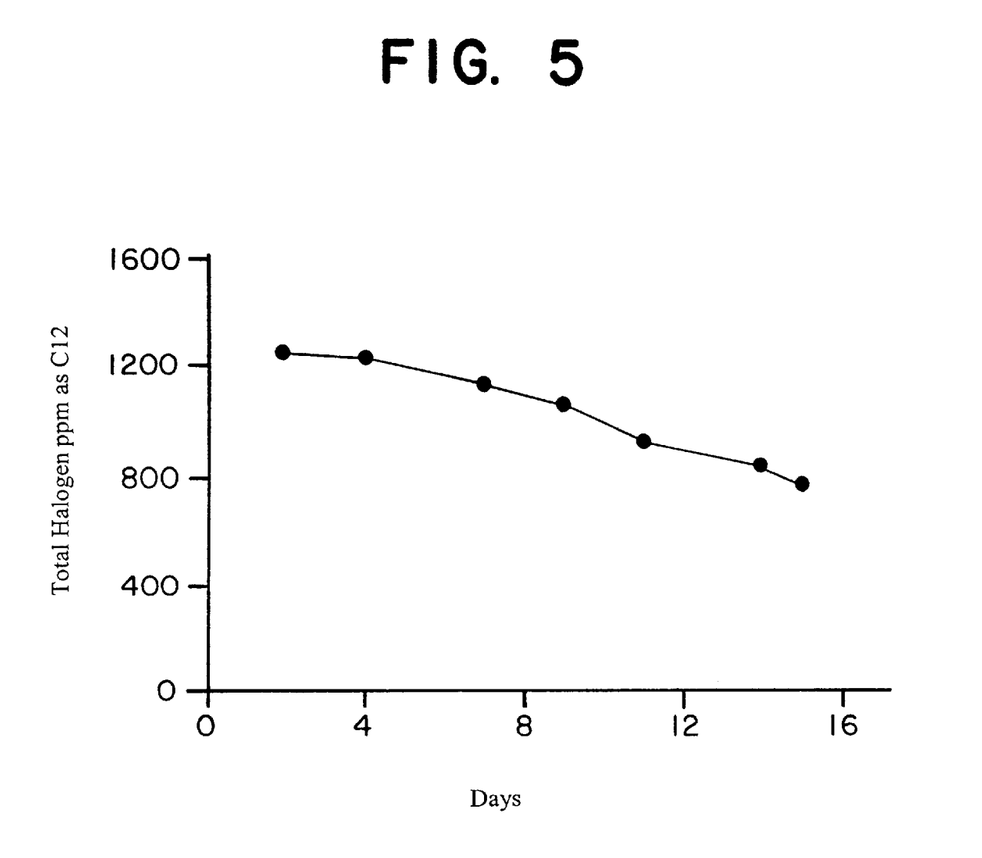
FIG. 5 is a graph of the halogen concentration (expressed as ppm of $Cl_2$) of a solution produced using a feeder of FIG. 2 as a function of operational days with the solid oxidizer bed being Dantobrom® PG granular.

A large (500 gallon total tank capacity) high concentration feeder was constructed as shown in FIG. 2. This feeder was tested utilizing approximately 1000 kg Dantobrom® PG granular of an average particle size of approximately 3.3 mm. The average product delivery rate was about 34 kg/day (i.e., about 34 kg of Dantobrom® PG granular was dissolved in the product stream). As shown in FIG. 5, the feeder provided acceptable outlet product concentration variability over 15 days of continuous operation. As used herein "acceptable product concentration variability" is defined by maintenance of the outlet product halogen concentration within 250 ppm of the 1050 ppm target average. FIG. 5 illustrates the advantages of the present system which utilizes large capacity, reduced cost, atmospheric vessels for delivering high concentrations of solid oxidizers.

All patents, applications, articles, publications, and test methods mentioned above are hereby incorporated by reference.

Many variations of the present invention will suggest themselves to those skilled in the art in light of the above detailed description. Such obvious variations are within the full intended scope of the appended claims.

What is claimed is:

1. A feeder for dissolving a solid material into an aqueous solution, the feeder comprising:
   (a) a tank for containing a bed of solid material having a top surface, the tank having a bottom, an inlet, and an outlet;
   (b) a disperser for introducing the aqueous solution into the tank, the disperser in fluid communication with the inlet of the tank, wherein the disperser is below the top surface of the bed of solid material; and
   (c) a control unit for sensing a combined bed and aqueous solution volume in the tank and maintaining the combined volume within a predetermined range during solution removal;
   wherein the solid material is a solid oxidizer.

2. The feeder of claim 1, wherein the feeder is configured and operated to maintain a sufficient volume of solid oxidizer in the tank to produce an aqueous solution having a concentration of solid oxidizer which is at least 30% of the saturation concentration (by weight) of solid oxidizer in the aqueous solution.

3. The feeder of claim 1, wherein the predetermined range is within 10% of an initial combined bed and aqueous solution volume prior to solution removal.

4. The feeder of claim 1, wherein the feeder is operated at atmospheric pressure.

5. The feeder of claim 1, wherein the volume of the tank is greater than 270 gallons.

6. The feeder of claim 1, wherein the volume of the tank is greater than 400 gallons.

7. The feeder of claim 1, wherein the volume of the tank is greater than about 600 gallons.

8. The feeder of claim 1, wherein the bed volume is greater than 250 gallons.

9. The feeder of claim 1, wherein the solid oxidizer is a non-halogenated oxidizer.

10. The feeder of claim 9, wherein the solid oxidizer is a non-halogenated oxidizer selected from the group consisting of sodium percarbonate, sodium perborates, sodium persulfate, potassium peroxymonosulfate, magnesium monoperoxyphthalate, and any combination of any of the foregoing.

11. The feeder of claim 1, wherein the solid oxidizer is a halogenated hydantoin.

12. The feeder of claim 1, wherein the solid oxidizer is a halogenated oxidizer selected from the group consisting of 1-chloro-5,5-dimethyl hydantoin, 1-chloro-5-ethyl-5-methylhydantoin, 1-bromo-3-chloro-5,5-dimethyl hydantoin, 1,3-dichloro-5,5-dimethylhydantoin, 1,3-dichloro-5,5-methyethylhydantoin, 1,3 dibromo-5,5-dimethylhydantion, trichlorocyanuric acid, sodium dichlorocyanuric acid, calcium hypochlorite, lithium hypochlorite, and any combination of any of the foregoing.

13. The feeder of claim 1, further comprising:
   an inlet conduit connected to an aqueous solution supply and the tank inlet for delivering the aqueous solution to the dispenser; and
   an outlet conduit connected to the tank outlet for discharging a product stream from the tank, the product stream comprising the aqueous solution containing the dissolved solid material.

14. The feeder of claim 13, wherein the control unit comprises:
   a controller; and
   a control valve disposed along the inlet conduit for adjusting the flow rate of the aqueous solution through the inlet conduit and into the tank, the control valve being in communication with the controller which signals and causes the control valve to open or close.

15. The feeder of claim 14, wherein the control valve includes an electronic valve actuator that is in communication with the controller and controls an in-line ball valve that is disposed along the inlet conduit.

16. The feeder of claim 14, further comprising:
   a first valve disposed along the inlet conduit upstream from the control valve for permitting or preventing the aqueous solution from flowing through the inlet conduit and the control valve and into the tank inlet, the first valve being in communication with the controller which signals the first valve to open or close under select conditions.

17. The feeder of claim 16, wherein the select conditions are where the combined bed and aqueous solution volume has achieved a maximum operating volume within the tank.

18. The feeder of claim 13, wherein the outlet conduit comprises:
   at least one valve device for varying the flow rate of the aqueous solution from the tank;

a flow meter for detecting the flow rate of the product stream within the outlet conduit; and a pump for discharging the product stream from the tank and through the outlet conduit.

19. The feeder of claim 13, wherein the control unit comprises:

a controller;

a control valve disposed along the inlet conduit for adjusting the flow rate of the aqueous solution through the inlet conduit and into the tank;

a sensor device for detecting the combined volume within the tank, the sensor device sending a first control signal to the controller which is representative of the sensed combined volume, the controller sending a second control signal to the control valve, based on the first control signal, for one of maintaining and adjusting a position of the control valve.

20. The feeder of claim 1, wherein the control unit includes a sensor device for detecting the combined volume within the tank, the sensor device being in communication with a controller for controlling at least a flow rate of the aqueous solution so as to maintain the concentration of the solid oxidizer in the removed solution within a second predetermined range.

21. The feeder of claim 20, wherein the sensor device is a device selected from the group consisting of a float valve sensing device, a conductance level switch, an ultrasonic sensing device, and any combination of any of the foregoing.

22. The feeder of claim 20, wherein the second predetermined range is a solid oxidizer concentration that is at least about 30% of the saturation concentration (by weight) of the solid material in the aqueous solution.

23. The feeder of claim 1, wherein the feeder is configured and operated to maintain a sufficient volume of solid oxidizer in the tank to produce an aqueous solution having a concentration of solid oxidizer which is at least 75% of the saturation concentration (by weight) of solid oxidizer in the aqueous solution.

24. A feeder for dissolving a solid material into an aqueous solution, the feeder comprising:

(a) a tank open to atmospheric conditions for containing a bed of solid material having a top surface, the tank having a bottom, an inlet, and an outlet;

(b) a disperser for introducing the aqueous solution into the tank, the disperser in fluid communication with the inlet of the tank, wherein the disperser is below the top surface of the bed of solid material; and (c) a control unit for controlling a combined bed and aqueous solution volume within the tank so that one of (i) the combined volume is maintained within a predetermined first range and (ii) a concentration of dissolved solid material in a product stream discharged from the tank is maintained within a second predetermined range;

wherein the solid material is a solid oxidizer.

25. A method for dissolving a solid material into an aqueous solution, the method comprising the steps of:

(a) disposing a bed of solid material into a tank, the bed having a top surface;

(b) introducing the aqueous solution below the top surface of the bed;

(c) removing the solution above the top surface of the bed; and (d) controlling the combined bed and aqueous solution volume so that it is within a predetermined range during solution removal;

wherein the solid material is a solid oxidizer.

26. The method of claim 25, wherein the predetermined range is within 10% of an initial combined bed and aqueous solution volume.

27. The method of claim 25, wherein controlling the combined bed and aqueous solution volume within the tank comprises the steps of:

generating a first signal representative of the combined volume within the tank, the first signal being delivered to a controller;

processing the first signal at the controller; and communicating with a control valve disposed along an inlet conduit so as to position the control valve in a position that maintains the combined volume within the predetermined range.

28. The method of claim 27, wherein the step of generating a first signal comprises the steps of:

providing an ultrasonic sensing device for detecting the combined volume within the tank;

transmitting an ultrasonic beam toward the aqueous solution and the bed and receiving back a deflected ultrasonic beam; and processing the deflected ultrasonic beam and converting the sensed combined volume into the first signal which is a current based signal.

29. The method of claim 27, wherein the step of generating a first signal comprises the steps of:

providing a conductance level switch for detecting the combined volume within the tank, the switch having a first probe and a second probe;

disposing the first probe within an interior of the tank so that it is submersed in the aqueous solution during normal operating conditions;

disposing the second probe within the interior of the tank at a position above a maximum operating level of the aqueous solution; and wherein when both the first and second probes are submersed in the aqueous solution, a closed loop is formed and the first signal is sent to the controller.

30. The method of claim 27, wherein the first signal is generated by a device selected from the group consisting of a float valve sensing device, a conductance level switch, an ultrasonic sensing device, and any combination of any of the foregoing.

31. The method of claim 27, wherein the step of controlling the combined volume comprises at least one of the steps of (a) adjusting the control valve to vary a flow rate of the aqueous solution into the tank, and (b) closing the control valve for a period of time to prevent aqueous solution from entering the tank.

32. The method of claim 25, wherein the volume of the bed is maintained at a volume sufficient to obtain a solution having a concentration of solid oxidizer which is at least 30% of the saturation concentration (by weight) of the solid oxidizer.

33. The method of claim 25, wherein the volume of the bed is maintained at a volume sufficient to obtain a solution having a concentration of solid oxidizer which is at least 75% of the saturation concentration (by weight) of the solid oxidizer.

* * * * *